S. A. KROM.
SINTERING APPARATUS.
APPLICATION FILED APR. 5, 1913.
1,125,125.
Patented Jan. 19, 1915.
2 SHEETS—SHEET 1.
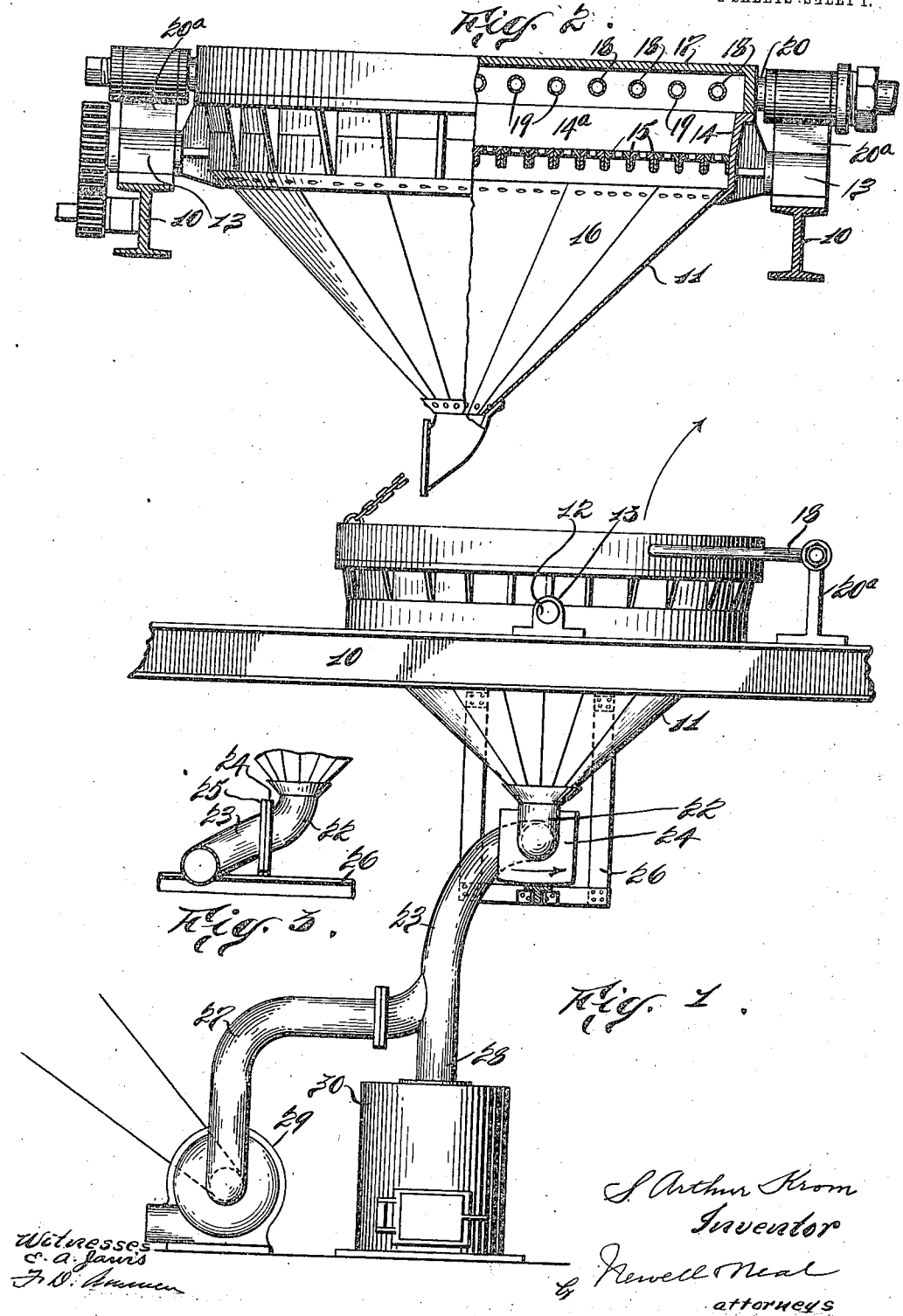

S. A. KROM.
SINTERING APPARATUS.
APPLICATION FILED APR. 5, 1913.

1,125,125.

Patented Jan. 19, 1915
2 SHEETS—SHEET 2.

Witnesses:
C. A. Jarvis

Inventor
S. Arthur Krom
by Newell & Neal
attorneys.

UNITED STATES PATENT OFFICE.

STEPHEN ARTHUR KROM, OF BIRMINGHAM, ALABAMA.

SINTERING APPARATUS.

1,125,125.  Specification of Letters Patent.  Patented Jan. 19, 1915.

Application filed April 5, 1913. Serial No. 759,129.

*To all whom it may concern:*

Be it known that I, STEPHEN ARTHUR KROM, a citizen of the United States, residing at Birmingham, county of Jefferson, and State of Alabama, have invented certain new and useful Improvements in Sintering Apparatus, of which the following is a clear, full, and exact description.

This invention relates to apparatus such as used in performing the operation of sintering or fusing together fine particles of ore such as iron-ore and which apparatus is usually known in metallurgy as sintering apparatus. There are several such apparatuses in use at the present time in one of which a conveyer is used for running the ore in contact with a flame and in another form of which the sintering pan is provided with means for supporting a bed of ore which *in situ* is subjected to the action of a flame and in which a draft of air is produced so as to facilitate the fusing.

The objects of my invention generally are to improve such sintering apparatus so that the process may be performed more expeditiously and satisfactorily.

One of the specific objects of the invention is to provide means for preventing the space under the grate bars from filling up and becoming clogged by the accumulation of fine material falling through the grate bars.

Another specific object of the invention is to improve the draft so as not to interfere with the proper action of the apparatus.

Another object of the invention is to provide means for equalizing the draft in the pan.

These being among the objects of the present invention, the same consists of certain features of construction and combinations of parts to be hereinafter described and then claimed with reference to the accompanying drawings showing a suitable embodiment of the invention, and in which—

Figure 4:
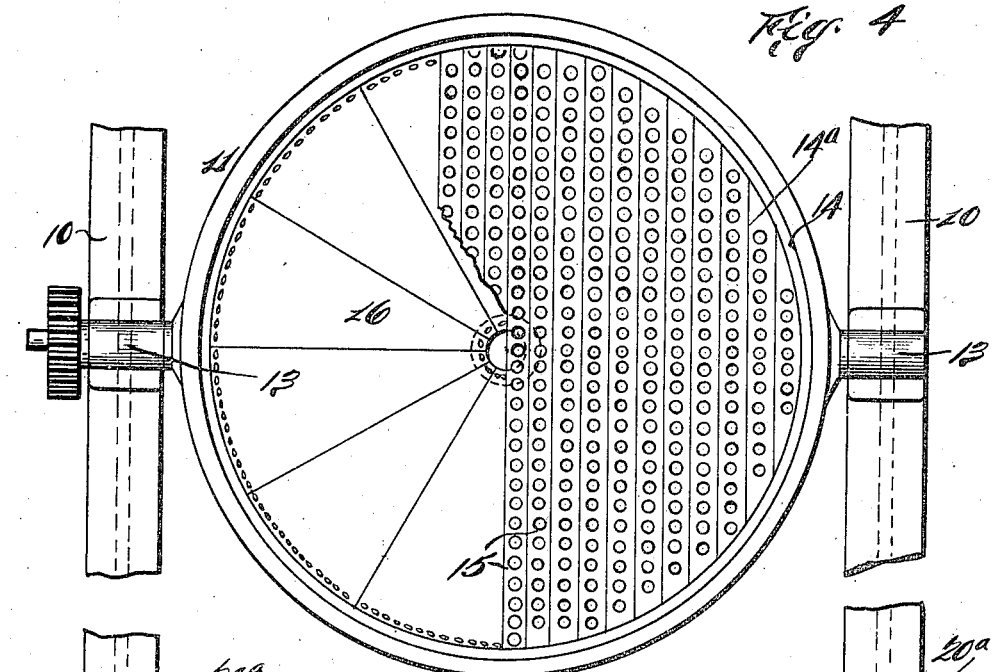
Figure 5:
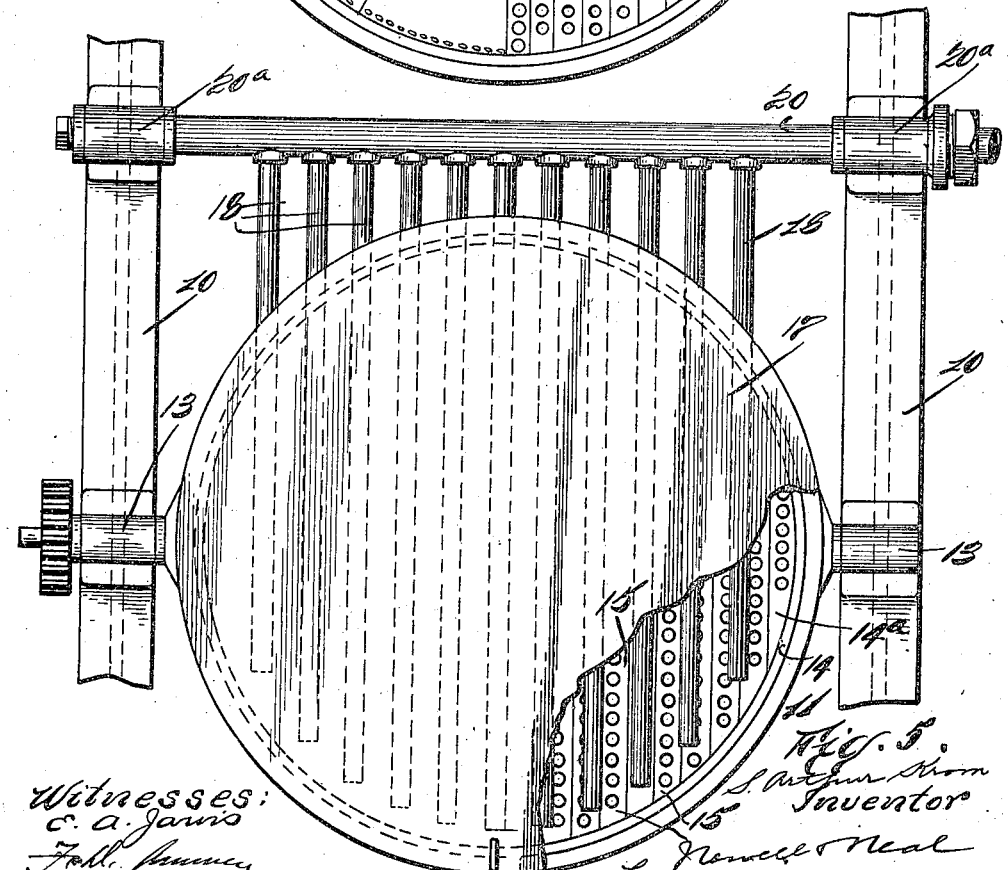

Figure 1 is a side elevation of a sintering apparatus illustrating the present improvement; Fig. 2 is a side elevation of the pan and concomitant parts partly in section, and viewed at a quarter turn from the corresponding parts shown in Fig. 1; Fig. 3 is a detail sectional view illustrating an improved joint; Fig. 4 is a plan view of the pan and a part of the grate, the cover being removed, and Fig. 5 is a plan view of the pan, cover and burner, a portion of the cover being broken away.

Referring to the drawings, means such as beams 10 are shown for supporting the pan 11, said pan being provided with trunnions 12 which are journaled in bearing boxes 13 supported on said beams. Said pan 11 has preferably a body which is of general conical form although it may be of pyramidal or equivalent form. The said pan is provided above its conical or other bottom with an upwardly extending portion 14 which forms the outer wall of an ore chamber $14^a$ in which the ore is placed upon a suitable perforated support or grate 15 supported by said wall. Below the said grate the bottom of the pan surrounds a space 16 through which any material falling through the grate may drop into a trap below, as described later.

A preferably tight fit cover 17 for the pan or lower section is provided and the same is equipped with a series of burner tubes 18 preferably formed of gas-pipe and having jet orifices 19 from which the gas, as producer gas, issues so that it may be ignited, and a flame projected upon the mass of ore supported upon the grate 15. These burner tubes 18 lead from a supply-pipe 20 outside of the cover, and which furnishes a pivot for the cover and is journaled in suitable supports as $20^a$ arranged on the supporting frame 10. The said supply-pipe 20 may be parallel with the supporting trunnions of the sintering pan but it may be otherwise arranged. Said cover is preferably immovable laterally of the walls 14 of the pan so that when it is in position and fitted snugly against said walls a partial vacuum may be produced within the pan. A chain or other flexible connection is attached to the cover, and it may be operated by a counterweight (not shown), the chain being led over a suitable pulley, so that the cover may be opened and closed with the least effort.

By the construction shown, a sealed chamber is formed above the grate as the said cover fits on the pan or lower section in airtight manner, and being closed no air can enter said chamber through the walls formed by said cover or upper section and the pan or lower section.

A combined suction and discharge trunk leads from the smaller end of the open bottom of the pan, said trunk being preferably in sections 22 and 23, the section 22 being an elbow pipe secured to the pan and its lower end directed laterally and preferably squared off at substantial right angles to the horizontal, or the diameter of the pan. Said elbow pipe is provided at its outer end with a flange 24 and is adapted to register with the other section 23 of the trunk, which section 23 is provided with a flange 25, said section 23 being supported upon a part 26 of the supporting frame 10. The upper flanged end of the trunk section 23 is so positioned that when the pan hangs in normal position, a closed joint is produced at the meeting ends of the sections 22 and 23, the flanges 24 and 25 coming opposite each other. This joint forms a tight connection between the sections of the trunk when the pan is in normal position and at the same time permits the pan to be swung on its trunnions by any suitable means for dumping the sintered ore out of the pan.

Section 23 of the trunk is bifurcated to form two legs or branches 27, 28, one of which is connected with an exhaust fan 29, while the other branch 28 leads to a trap 30, the arrangement being such that any material falling through the grate will be deposited in the said trap, thus preventing it from accumulating below the grate and interfering with the suction draft through the branch 27. It will be seen that, considering the sections 23 and 27 as the trunk, there is a downwardly presented opening in said trunk, at the top of the section 28, which opening is located between the pan and the exhausting means 29.

The operation of the apparatus is as follows: The material such as iron ore in fine particles mixed with combustible material is spread upon the grate 15 of the pan, so as to form a thick bed or charge above the grate. Gas is admitted to the burner tubes 18 and the same is ignited, the fan being thereupon started, when the apparatus is in operation. When the material supported on the grate has been all sintered, the flame may be extinguished, and the cover 17 is then raised, whereupon the pan is swung on its trunnions and the finished material on the grate dumped into a suitable receptacle. The operation of the apparatus may then be resumed in an obvious manner. It will be observed that the improved pan is so arranged and operated that there is no accumulation of the material below the grate which would interfere with the proper action of the apparatus, as any material falling through the grate is automatically cleared from the pan. It will also be noted that by means of the described improvement an even suction is obtained in the pan throughout its surface below the grate, by reason of the fact that the suction is taken through the apex of the conical bottom of the pan, and this insures a uniform sintering or fusion in all parts of the pan. Preferably all of the walls of the pan extend to the same height so that the cover when in position will fully close the upper part of the pan, in consequence of which the downward suction is more completely equalized throughout the pan.

It is obvious that various modifications of this improvement may be resorted to, as parts may be omitted, parts added and parts modified without materially altering the character and scope of the invention as defined in the claims.

What I claim is:

1. In a sintering apparatus, the combination of supporting means, a grated open-bottomed sintering pan, having walls tending to direct any material falling through its grate out through its open bottom, means for pivoting said pan on said supporting means, and a discharge trunk with which the open bottom of said pan may be operatively connected with or disconnected from by the swinging of said pan.

2. A grated open-bottomed sintering pan, having walls tending to direct any material falling through its grate out through its bottom, in combination with a downwardly extending combined suction and material discharge trunk in communication with said open bottom, and suction means connected with the outer end of said trunk so as to exert a downward suction through said trunk, said trunk having a material-discharge opening between said pan and said suction means but which is separate from the connection of said trunk with said suction means.

3. A grated open-bottomed sintering pan, having walls tending to direct any material falling through its grate out through its open bottom, in combination with a downwardly extending combined suction and material discharge trunk, a trap below and in communication with said trunk and into which said material is discharged downwardly, and suction means communicating with said trunk at a point separate from the point of communication of said trap with said trunk so as to exert a downward suction through said trunk, whereby the suction air and said material are separated and conducted to separate points.

4. In a sintering apparatus, the combination of a single sintering pan having an open bottom, a grate in said pan above said opening, a closed cover for excluding air from the space between it and said grate, and coacting in substantially air-tight manner with all of the side walls of said pan to close the upper part thereof, and means for creating a suction, downwardly and outwardly through said opening, the walls of said pan below said grate being closed except for said opening and the said suction means being so adapted thereto that together they equalize the draft in said pan whereby a partial vacuum may be maintained in said pan.

5. In a sintering apparatus, the combination of supporting means, a grated open-bottomed sintering pan, having walls tending to direct any material falling through its grate out through its open bottom, and means for pivoting said pan on said supporting means, and a discharge trunk leading from said open bottom and being in two sections, one of which is supported in fixed position relatively to the pan, and the other of which is carried by the pan and is adapted to form a joint with the upper end of said fixed section.

6. A grated open-bottomed sintering pan, having walls tending to direct any material falling through its grate out through its open bottom, and means on which said pan is movably mounted, in combination with a combined suction and discharge trunk in communication with said open bottom and being in two sections, one of which is supported in fixed position relatively to the pan, and the other of which is carried by the movable pan and is adapted to form a joint with the upper end of said fixed section.

7. A grated open-bottom sintering pan, having walls tending to direct any material falling through its grate out through its open bottom, in combination with a combined suction and discharge trunk in communication with said open bottom and being in two sections, one of which extends downward and is supported in fixed position relatively to the pan, and the other of which is carried by the pan and is adapted to form a joint with the upper end of said fixed section, and suction means connected with the said fixed section of said trunk.

8. A grated open-bottomed sintering pan, having walls tending to direct any material falling through its grate out through its open bottom, in combination with a movable closed cover provided with burners, and fitted in substantially air-tight manner against the upper edge of said pan, whereby the flame from said burners is concentrated directly onto the charge of ore on said grate and within the walls above said grate.

9. A grated open-bottomed sintering pan, having walls tending to direct any material falling through its grate out through its open bottom, in combination with a trap having an opening communicating with said open bottom and through which said material is discharged into said trap, and means exerting a downward suction, arranged in communication with the open-bottom of said pan at a point below said pan and between the said pan and the opening of said trap, whereby the suction air and said material are separated and conducted to separate points.

10. A grated open-bottomed sintering pan, having walls tending to direct any material falling through its grate out through its open bottom, and means on which said pan is movably mounted, in combination with a trunk in communication with said open-bottom, and a joint between said pan and trunk adapted to be separated or closed at will by the movement of one of said parts, the line of separation being at an angle to the horizontal.

11. A grated open-bottomed sintering pan, having walls tending to direct any material falling through its grate out through its bottom, in combination with a downwardly extending combined suction and material discharge trunk in communication with said open bottom, said walls and trunk being clear of obstructions, and suction means connected with the outer end of said trunk so as to exert an unobstructed downward suction through said trunk.

Signed at Birmingham, Ala., this 31st day of March 1913.

S. ARTHUR KROM.

Witnesses:
M. LEE BONNER,
A. J. ROBINS.